United States Patent [19]

Kunz

[11] 4,245,711

[45] Jan. 20, 1981

[54] WEIGHING APPARATUS INCLUDING A TAPPED ELECTROMAGNETIC LOAD COMPENSATION COIL

[75] Inventor: Peter Kunz, Tann-Rüti, Switzerland

[73] Assignee: Mettler Instrument AG, Greifensee, Switzerland

[21] Appl. No.: 65,570

[22] Filed: Aug. 10, 1979

[30] Foreign Application Priority Data

Oct. 20, 1978 [CH] Switzerland .................. 10874/78

[51] Int. Cl.³ .................................................. G01G 7/02
[52] U.S. Cl. ................................. 177/212; 177/210 EM
[58] Field of Search ........................ 177/212, 210 EM

[56] References Cited

U.S. PATENT DOCUMENTS

| | | | |
|---|---|---|---|
| 3,786,678 | 1/1974 | Kunz | 177/212 X |
| 3,786,884 | 1/1974 | Allenspach | 177/210 EM |
| 3,816,156 | 6/1974 | Baumann | 177/212 X |
| 3,955,638 | 5/1976 | Wasko | 177/212 |
| 4,109,738 | 8/1978 | Kunz | 177/212 |

FOREIGN PATENT DOCUMENTS 2722093 6/1978 Fed. Rep. of Germany ........... 177/212

Primary Examiner—Joseph W. Hartary
Attorney, Agent, or Firm—Laubscher & Laubscher

[57] ABSTRACT

Weighing apparatus of the electromagnetic load compensation type is disclosed, including a load support connected for movement relative to a frame, a mechanical-transmission ratio-establishing lever connecting the load support with a compensation coil arranged for displacement relative to a permanent magnet arrangement connected with the frame, a position-responsive circuit for supplying compensation current to the coil for creating an electromagnetic force that reacts with the permanent magnet field to maintain the load support in its initial no-load condition, and indicating means for displaying the magnitude of the applied load as a function of the compensation current. To permit the use of the lever in different lever-ratio-establishing environments without the use of attendant balancing weights, the compensation coil is tapped to define a pair of coil portions (28a, 28b) that are alternately energized by a switching device (42) to apply different forces upon the load support.

9 Claims, 5 Drawing Figures

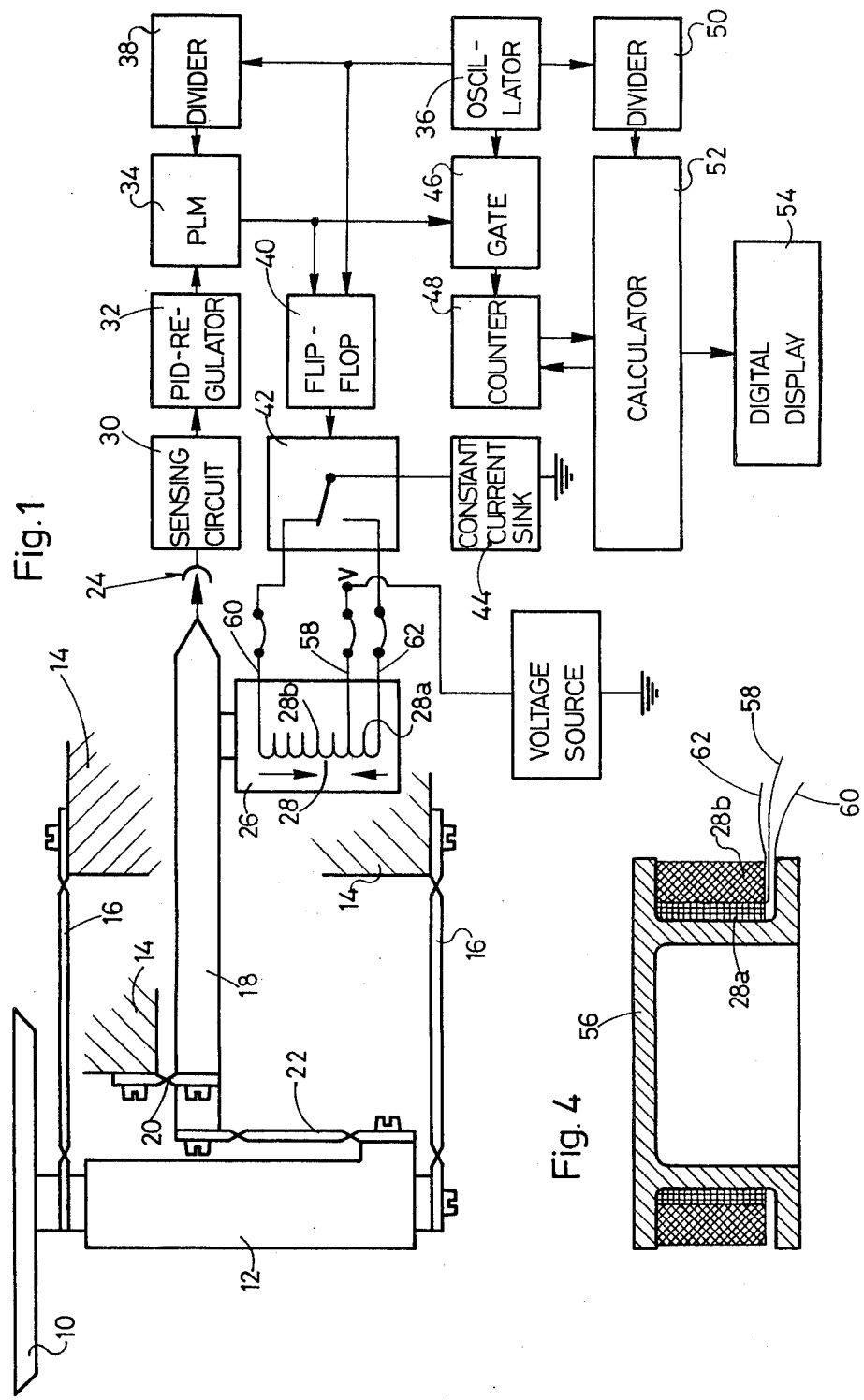

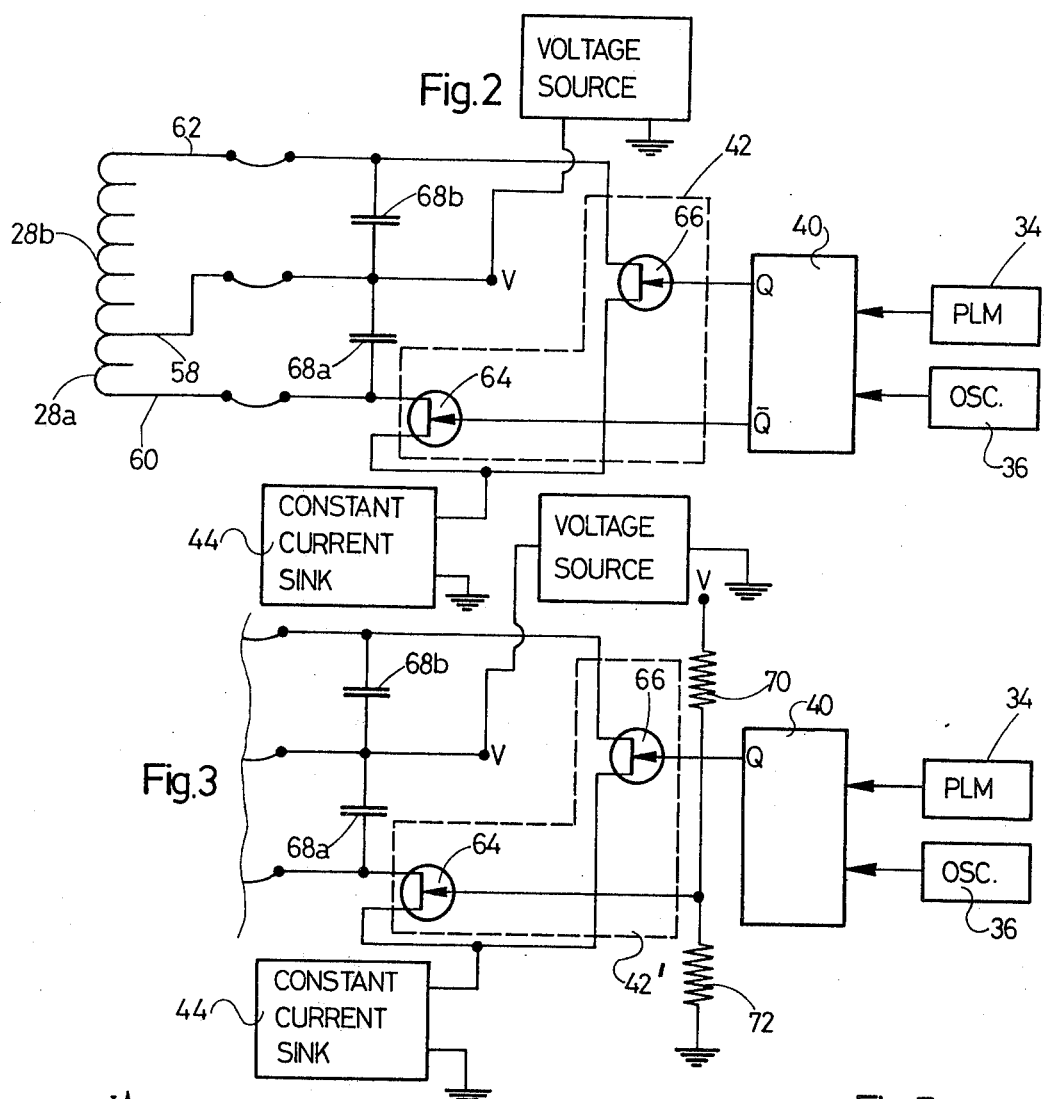
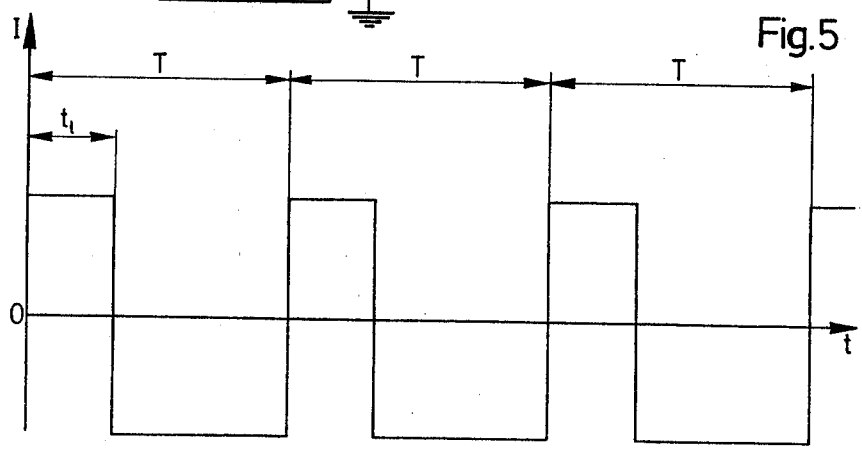

WEIGHING APPARATUS INCLUDING A TAPPED ELECTROMAGNETIC LOAD COMPENSATION COIL

BRIEF DESCRIPTION OF THE PRIOR ART

As evidenced by the prior U.S. patents to Kunz U.S. Pat. Nos. 3,786,678 and 4,109,738, Allenspach U.S. Pat. No. 3,786,884, and Baumann et al U.S. Pat. No. 3,816,156, it is known in the art to provide weighing apparatus of the electromagnetic load compensation type including a load support connected for movement relative to a frame; electromagnetic load compensation means including a compensation coil connected with the load support, and associated permanent magnet means connected with the frame; and position-responsive means for supplying compensation current to the coil to maintain the load support at its initial no-load position, whereby the magnitude of the applied load may be indicated as a function of the magnitude of the compensation current. It is also known in such scales to provide mechanical-transmission ratio-establishing lever means between the load support and the electromagnetic load compensation means.

In the practical implementation of such scales, it is desirable to use as many identical components as possible for various types of scales of the same family. Thus it is, for example, desirable to use the same lever-ratio-establishing levers for scales having different mechanical transmission ratios, and thus differing maximum loads. This, of course, then presents a problem where, in certain cases it becomes necessary to add an additional balancing load at the end of the lever. This measure is unsatisfactory because it increases the material and assembly expenditure, and because it also increases the inherent dead weight of the entire scale.

SUMMARY OF THE INVENTION

In order to avoid the necessity of the aforementioned balancing weights, it is a primary object of the present invention to provide a weighing apparatus of the electromagnetic load compensation type wherein the compensation coil which is connected with the mechanical-transmission ratio-establishing lever is tapped to define a pair of coil portions that are alternately energized via switch means to alternately apply to the load support different forces developed by the coil portions, respectively. The magnitude and direction of each of the applied forces depends, for example, on the position of the tap and on the lengths of the periods of energization of the coil portions, respectively. The forces produced by the coil portions may cooperate either with or against the force developed by the load being weighed.

Another advantage of the invention is that since one of the two coil portions is always energized, the use of a dummy load (as shown in the Kunz U.S. Pat. No. 3,786,678) for receiving the compensation current during the times of pauses (i.e., the time segments during which the constant current does not flow through the compensation coil) may be eliminated. Furthermore, since the use of additional balancing weights is avoided, there is an appreciable reduction in the power loss of a coil.

It is known in the prior art (as disclosed by the Wasko U.S. Pat. No. 3,955,638) to reverse the direction of a compensation current with load-dependent amplitude in case of half-load, that is to say, in case of smaller loads, whereby current of one polarity flows through the same windings of the coil, while in case of heavier loads, current with the opposite polarity flows through them. Compared to this known weighing apparatus, the present invention offers the advantage that we need only one single current source, thereby resulting in less expenditure and less critical structural components. In the present invention, the current always flows in the same direction, at first through one coil part and then through the other coil part.

German U.S. Pat. No. 2,722,093 discloses a scale in which the current flowing through the compensation coil alternates in rapid succession alternately between positive and negative values. Earlier, as discussed with regard to the Wasko U.S. Pat. No. 3,955,638, the disadvantages connected with current switching from one polarity to the other were discussed, and the above comments apply here increasingly because, on account of the high frequency of switching operations, the form and constancy of the switching sides noticeably influence the accuracy and reproducibility of the measurement results.

The two coil portions are preferably arranged in superposed relation, one above the other. This makes for a relatively low manufacturing expenditure and optimum space utilization (the latter would also be obtained in case of coil parts wound up in a bifilar manner).

BRIEF DESCRIPTION OF THE DRAWING

Other objects and advantages of the invention will become apparent from a study of the following specification when viewed in the light of the accompanying drawing in which:

FIG. 1 is a somewhat diagrammatic illustration of the weighing apparatus of the present invention, the electrical circuitry being illustrated in block diagram form;

FIG. 2 is a detailed electrical schematic diagram of the switch means of FIG. 1;

FIG. 3 is an electrical schematic diagram of another embodiment of the switch means of FIG. 2;

FIG. 4 is a detailed sectional view of the compensation coil and coil carrier assembly; and FIG. 5 is a diagram illustrating current plotted versus time during operation of the apparatus of FIG. 1.

DETAILED DESCRIPTION

Referring first more particularly to FIG. 1, the weighing apparatus is of the conventional "return-to-zero" electromagnetic load compensation type including a scale pan 10 supported by a load support 12 which is guided for vertical displacement relative to the frame 14 by a pair of parallel guide links 16. Two-armed lever 18 suspended intermediate its ends by bearing 20 from the frame 14 is connected at one end with the load support 12 via load supporting link 22. Connected with the other end of the lever 18 are the movable component of photoelectric position sensing means 24, and the compensation coil 28 of load compensation means 26 which includes permanent magnet means (not shown) connected with the frame 14, the permanent magnet means being symmetrical about its central vertical axis. As distinguished from the weighing apparatus of the prior art, the present invention is characterized in that the compensation coil 28 has a center tap connection defining coil portions 28a and 28b, as will be described in greater detail below.

The structure of the scale and the permanent magnet system is described, for example, in the previously mentioned Kunz U.S. Pat. No. 4,109,738. From the likewise previously mentioned U.S. Pat. Nos. 3,786,678, 3,786,884, and 3,816,156, the structure and operating procedure of the electrical part of the system is also known, and accordingly will be covered here only in a summary fashion.

The position signal from position sensing means 30 is shaped by the PID regulator 32 and is supplied to one input terminal of the pulse length modulator 34. To the other input terminal of the pulse length modulator is applied low-frequency signal supplied by oscillator 36 via frequency divider 38, whereupon the PLM 34 compares the position sensing signal with a periodic sawtooth waveform to produce pulses the lengths of which correspond with the magnitude of the position sensing signal (as disclosed in the aforementioned U.S. Pat. Nos. 3,786,678 and 3,786,884). The pulse length modulated signal is fed to one input of the bistable flipflop component 40, a clock or synchronizing signal from oscillator 36 being supplied to the other input of the flip-flop. The flipflop 40 is operable to control the switching condition of switch means 42 (and, consequently, the states of energization of the coil portions 28a and 28b) as will be discussed in greater detail below.

The pulse modulated signal from PLM 34 further controls the operation of gate 46 through which the high frequency oscillator signals are supplied to counter 48, whereby the number of pulses counted by the counter 48 corresponds with the lengths of the pulses from PLM 34 and, consequently, the magnitude of the position sensing signal. A reduced frequency signal supplied from oscillator 36 via divider 50 causes calculator 52 to periodically receive the count from counter 48 and to display the measurement result on digital display means 54.

In known scales, according to the U.S. patents mentioned above in reference to FIG. 1, there is provided, in each case, one compensation coil through which compensation current flows always only in one direction, and this takes place in the normal case only during a portion of the time interval determined by the duration of a sawtooth voltage ramp in the modulator 34. According to the present invention, coil 28 and switch means 42 have been modified as shown in FIGS. 2-4. More particularly, coil 28 is wound upon a coil carrier 56 in the form of a pair of winding portions 28a, 28b, as shown in FIG. 4. Connected with the intermediate coil tap connection is a connecting wire 58, and two other connecting wires 60 and 62 are connected with the free ends of the coil 28, respectively. The coil carrier 56 is attached to lever 18, as indicated above.

Switch means 42, according to FIG. 2, is formed by two field-effect transistors (FET) 64, 66 which are controlled by the outputs $\bar{Q}$ and Q, respectively, of the flipflop 40. Connected in parallel across the coil portions 28a and 28b are a pair of capacitors 68a, 68b for equalizing the current pulses. Line 60 is connected with FET 64, line 62 is connected with FET 66, and line 58 is connected with the power supply terminal V. The other connections of FETs 64, 66 are connected with the constant current sink 44.

In operation, at the start of a given time interval T in FIG. 5 (i.e., at the start of a sawtooth ramp of pulse length modulator 34), FET 66 is selected by output Q of flipflop 40, whereupon compensating current I flows along the path including power supply terminal V, tap conductor 58, coil portion 28b, FET 66 and constant current sink 44, whereupon the compensation coil generates a downwardly directed force in the permanent magnet system 26. During this load-dependent span of time $t_1$ (see FIG. 5), the oscillator pulses are counted in the counter 48. When the sawtooth voltage in PLM 34 reaches the value of the regulator voltage, then the flipflop 40 is switched by PLM 34, whereupon the output $\bar{Q}$ is now active and constant current I flows along the path from terminal V, conductor 58, coil portion 28a, conductor 60, FET 64, and compensation current source 44, whereupon the force is reversed (i.e., is directed upwardly) for the rest of the interval T until, at the start of the next sawtooth voltage slope, the flipflop 40 is again switched to its initial condition.

The switch means 42 of FIG. 2 comprises a full conductively-controlled differential amplifier wherein, in one case, the current flows only through FET 64 and in the other case it flows exclusively through FET 66. This arrangement offers the advantage that it works even faster than the conventionally used switching transistor.

FIG. 3 shows a switch means modification 42' which, for example, can be practical if only one output (Q or $\bar{Q}$) is available from flipflop 40. The other output here is "replaced" by two resistances 70, 72, which, in case of suitable dimensioning, functionally correspond to the missing flipflop output. The ratio between resistances 70 and 72 is so selected that the potential, which has been applied to FET 64, will be between zero and the potential of signal Q.

In FIG. 5, the compensation current in coil 28 has been plotted over a period of time. Constant current I always flows through one portion of the coil (the other coil portion being open-circuited) and, at the start of each new interval T, as well as after the end of each time interval $t_1$, the current is conducted through the particular other coil part. The example shown in FIG. 5 roughly corresponds to loading the scale with ⅓ of the weighing capacity.

In the example described here, the winding ratio is 1:3, that is to say, the tap is ¼ of the total number of windings. Thus, the maximum compensation force which acts downwardly (for displacing the load support upwardly) comes to three times the maximum compensation force that works upwardly. If, by changing the position of bearing 20 longitudinally of the lever 18, a different lever ratio is selected, then the winding ratio must be adjusted accordingly. Thus, the tap may be adjustable to vary the number of turns of the winding portions. Consequently by appropriate adjustment of the compensation coil tap, the variations in lever balance may be compensated for without the use of equalizing or balancing weights.

An advantageous side effect of the invention is represented by the fact that temperature behavior is considerably more favorable than that achieved with conventional scales, whereby the load dependence of the power loss in the coil is considerably reduced.

While in accordance with the provisions of the Patent Statutes, the preferred form and embodiments have been illustrated and described, it will be apparent that changes may be made without deviating from the inventive concepts set forth above.

What is claimed is:

1. In a weighing apparatus of the electromagnetic load compensation type including a frame (14); load support means (10, 12) connected for movement relative to the frame; lever means (18) pivotally connected with said frame, a first portion of said lever means being connected with said load support means; load compensation means including a compensation coil (28) connected with another portion of said lever means, and permanent magnet means connected with the frame adjacent said compensation coil; position-responsive means operable upon the application of load to the load support for supplying compensation current to the compensation coil to maintain the load support means in its initial no-load position; and indicating means for displaying the magnitude of the applied load as a function of the compensation current supplied to the compensation coil; the improvement wherein (a) said coil includes intermediate its ends a tap for defining first and second coil portions (28a, 28b);

(b) and further wherein said compensation current supply means includes switch means (42) for supplying the compensating current alternately to said coil portions.

2. Apparatus as defined in claim 1, and further including flipflop means (40) controlling the operation of said switch means.

3. Apparatus as defined in claim 1, and further including a coil carrier (56) connected with said lever means, first and second coil portions being wound in concentric superposed relation on said coil carrier.

4. Apparatus as defined in claim 1, wherein said first and second coil portions have different numbers of turns, said coil portions being operable to alternately apply difference forces to said lever means, whereby a desired resultant compensating force may be applied to said lever means.

5. Apparatus as defined in claim 4, wherein the tap connection of said compensation coil is adjustable to vary the number of turns of said coil portions, respectively.

6. Apparatus as defined in claim 1, wherein the first and second coil portions are energized for unequal periods of time.

7. Apparatus as defined in claim 2, wherein said switch means comprises a pair of field effect transistors (64, 66) each including a control electrode and a pair of power circuit electrodes, one power circuit electrode of each field effect transistor being connected with the compensation current source, the other power circuit electrodes being connected with opposite ends of said compensation current winding, respectively, the control electrode of at least one of said field effect transistors being connected with an output terminal of the flipflop means; and further including means (58) connecting the winding tap with a voltage source, and a pair of capacitors (68a, 68b) connected across said first and second winding portions, respectively.

8. Apparatus as defined in claim 7, wherein said flipflop means includes a pair of output terminals connected with the control electrodes of said transistors, respectively.

9. Apparatus as defined in claim 1, wherein said compensating current supply means includes a constant current source, and means for supplying current from said source for periods of time corresponding with the magnitude of the load applied to the load support means.

* * * * *